(12) United States Patent
Moore et al.

(10) Patent No.: US 9,491,768 B1
(45) Date of Patent: Nov. 8, 2016

(54) WIRELESS COMMUNICATION USER EQUIPMENT ON-BOARD POLICY ENFORCEMENT

(71) Applicant: Sprint Communications Company L.P., Overland Park, KS (US)

(72) Inventors: Christopher James Moore, Shawnee, KS (US); Joao Teixeira, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/794,761

(22) Filed: Jul. 8, 2015

(51) Int. Cl.
*H04W 72/04* (2009.01)
*H04W 8/20* (2009.01)
*H04W 4/24* (2009.01)
*H04M 15/00* (2006.01)
*G06Q 20/36* (2012.01)
*G06Q 20/24* (2012.01)
*G06Q 20/32* (2012.01)
*G06Q 20/40* (2012.01)

(52) U.S. Cl.
CPC ......... *H04W 72/0493* (2013.01); *G06Q 20/24* (2013.01); *G06Q 20/3223* (2013.01); *G06Q 20/36* (2013.01); *G06Q 20/409* (2013.01); *H04M 15/09* (2013.01); *H04M 15/66* (2013.01); *H04W 4/24* (2013.01); *H04W 8/205* (2013.01)

(58) Field of Classification Search
None
See application file for complete search history.

(56) References Cited

U.S. PATENT DOCUMENTS

| | | | |
|---|---|---|---|
| 9,167,104 B2 * | 10/2015 | Dabbiere | H04M 15/885 |
| 2011/0165861 A1 * | 7/2011 | Wilson | H04K 3/65 455/411 |
| 2014/0335846 A1 * | 11/2014 | Wilson | H04K 3/65 455/418 |
| 2015/0317801 A1 * | 11/2015 | Bentley | H04N 7/181 382/107 |
| 2015/0348591 A1 * | 12/2015 | Kaps | G11B 27/17 386/201 |

* cited by examiner

*Primary Examiner* — Diane Mizrahi

(57) ABSTRACT

A user equipment (UE) is disclosed. The UE comprises a processor, a memory storing a usage policy, and an enforcement application stored in the memory. When executed by the processor, the enforcement application reads the usage policy, evaluates compliance of one of a UE configuration and a UE usage with the usage policy, determines that the UE configuration or UE usage are non-compliant with the usage policy; and presents a restricted screen on the touch-screen display, wherein the restricted screen provides touch input controls only for selecting to originate an phone call to emergency services (e911 call) and to at least one of restore the UE configuration to comply with the usage policy or adapt UE usage to comply with the usage policy.

20 Claims, 10 Drawing Sheets

WIRELESS COMMUNICATION USER EQUIPMENT ON-BOARD POLICY ENFORCEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some smartphones are sold by original equipment manufacturers (OEM) for $600 dollars or more. In the United States, it has been customary for telecommunications service providers to pay for the cost of the smartphone when a subscriber wishes to acquire a new smartphone. In exchange for paying the initial cost of the smartphone to the OEM, the telecommunication service provider imposes some obligations on the subscriber, e.g., the subscriber may sign a contract to agree to stay with the telecommunications service provider for a pre-defined period of time, partially paying for the device over the time period. The process of the telecommunication service provider purchasing a new smartphone from the OEM and signing the subscriber to a contract in exchange for the new smartphone is known as a subsidy. An electronic wallet may be an application on the new phone. Electronic wallets may function as an abstraction of a physical wallet that is used to hold credit cards, but instead of being physical, digitized. The electronic wallet may have information that is related to a physical credit card or multiple credit cards that may be used like a physical credit card, but allows a subscriber to not have to keep up with the physical credit cards. The subscriber may enter information about a credit card, such as the type of credit card, the sixteen digit number that identifies the credit card, the expiration date that is associated with the credit card, and the three digit security code that goes along with the credit card. The subscriber may automatically access this information after the information has been inputted into the electronic wallet. The information of the card is stored and displayed, securely. This allows the subscriber to use their digital credit card both simply and securely.

SUMMARY

In an embodiment, a user equipment (UE) is disclosed. The UE comprises a processor, a memory storing a usage policy, and an enforcement application stored in the memory. When executed by the processor, the enforcement application reads the usage policy, evaluates compliance of one of a UE configuration and a UE usage with the usage policy, determines that the UE configuration or UE usage are non-compliant with the usage policy; and presents a restricted screen on the touchscreen display, wherein the restricted screen provides touch input controls only for selecting to originate an phone call to emergency services (e911 call) and to at least one of restore the UE configuration to comply with the usage policy or adapt UE usage to comply with the usage policy.

In an embodiment, a method of using and enforcing a usage policy on a user equipment (UE) is disclosed. The method comprises installing a usage policy on the UE, wherein the usage policy mandates the maintenance of a specific credit card in the role of a default credit card by an electronic wallet application of the UE and storing an identity of the specific credit card in one of a system partition or a carrier partition of memory of the UE. The method further comprises transmitting an authorization for payment by a credit card assigned to fulfill the default card role in the electronic wallet application of the UE whose identity is stored in memory allocated for use by the electronic wallet, wherein the default card is automatically selected for use when the electronic wallet application is accessed by the UE for making a payment authorization. The method further comprises hecking by a launcher application compliance of the UE with the usage policy by comparing the identity of the specific credit card stored in the system partition or the carrier partition to the identity of the credit card associated with the default credit card role stored in the memory allocated for use by the electronic wallet application, wherein the launcher application is provided by an operating system of the UE. The method further comprises, in response to the checks failing to confirm a match of credit card identities, launching a restricted screen on a display of the UE via the launcher application, wherein the restricted screen allows the UE to pay a bill associated with the UE, and hides access to user interface controls to two or more of initiating a non-emergency phone call, accessing email, sending short message service (SMS) messages, accessing a contact list, using a web browser, using user installed applications, and using a global positioning system application.

In an embodiment, another method of enforcing usage policy on a UE is disclosed. The method comprises downloading a usage policy to a UE, evaluating compliance of the UE with the usage policy by an enforcement application executing on the UE, and determining by the enforcement application that the UE is not compliant with the usage policy. The method further comprises presenting by the enforcement application a restricted screen on a display of the UE, where the restricted screen provides input controls only for selecting to originate a phone call to emergency services (e911) and to restore the UE to compliance with the usage policy.

In an embodiment, a user equipment (UE) is disclosed. The UE comprises a processor, a memory, and an electronic wallet application stored in the memory. The electronic wallet application when executed by the processor transmits an authorization for payment by a credit card assigned to a default card role for the electronic wallet whose identity is stored in the memory, wherein the default card is automatically selected for use when the electronic wallet application is accessed by the UE for making a payment authorization. The UE further comprises a launcher application provided by an operating system of the UE. The launcher application when executed by the processor checks a status of the default card, wherein the launcher checks to see if a bill associated with the default card has been paid, wherein the launcher checks to if the default card is the card that was assigned to fulfill the default card role. The launcher, in response to one or more of the checks failing, launches a restricted screen on a display of the UE, wherein the restricted screen allows the user of the UE to pay a bill associated with the UE, allows the user to contact emergency services, and hides access to user interface controls to two or more of initiating a non-emergency phone call, accessing email, send short message service (SMS) messages, access a contact list, use a web browser, use user installed applications, and use a global positioning system application.

In an embodiment, a method of using and enforcing use of a default digital credit card on a user equipment (UE) is disclosed. The method comprises transmitting an authorization for payment by a credit card assigned to fulfill a default card role whose identity is stored in a memory executing on the UE by the UE, wherein the default card is automatically selected for use when the electronic wallet application is accessed by the UE for making a payment authorization. The method further comprises checking a status of the default card by the UE via a launcher application provided by an operating system (OS) of the UE, wherein the launcher checks to see if a bill associated with the default card has been paid, wherein the launcher checks to see if the default card is the card that was assigned to fulfill the default card role. The method further comprises, in response to one or more of the checks failing, launching by the launcher a restricted screen on a display of the UE, wherein the restricted screen allows the user of the UE to pay a bill associated with the UE, and hides access to user interface controls to two or more of initiating a non-emergency phone call, accessing email, sending short message service (SMS) messages, accessing a contact list, using a web browser, using user installed applications, and using a global positioning system application.

A method of using and enforcing use of a default card on a user equipment (UE) is disclosed. The method comprises transmitting an authorization for payment by a credit card assigned to fulfill a default card role whose identity is stored in the memory executing on the UE by the UE, wherein the default card is automatically selected for use when the electronic wallet application is accessed by the UE for making a payment authorization, wherein the information of the default card comprises one or more of a sixteen digit card number of the default card, a name associated with the default card, an expiration date of the default card, and a three digit security code of the default card. The method further comprises the UE checking a statue of the default card via a launcher application provided by an operating system of the UE, wherein the launcher checks to see if a bill associated with the default card has been paid, wherein the launcher checks to see if the default card is the card that was assigned to fulfill the default card role. The method further comprises the UE via the launcher application, in response to one or more of the checks failing, launching a restricted screen on a display of the UE, wherein the restricted screen allows the UE to pay a bill associated with the UE, and hides access to user interface controls to two or more of initiating a non-emergency phone call, accessing email, sending short message service (SMS) messages, accessing a contact list, using a web browser, using user installed application, and using a global positioning system application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
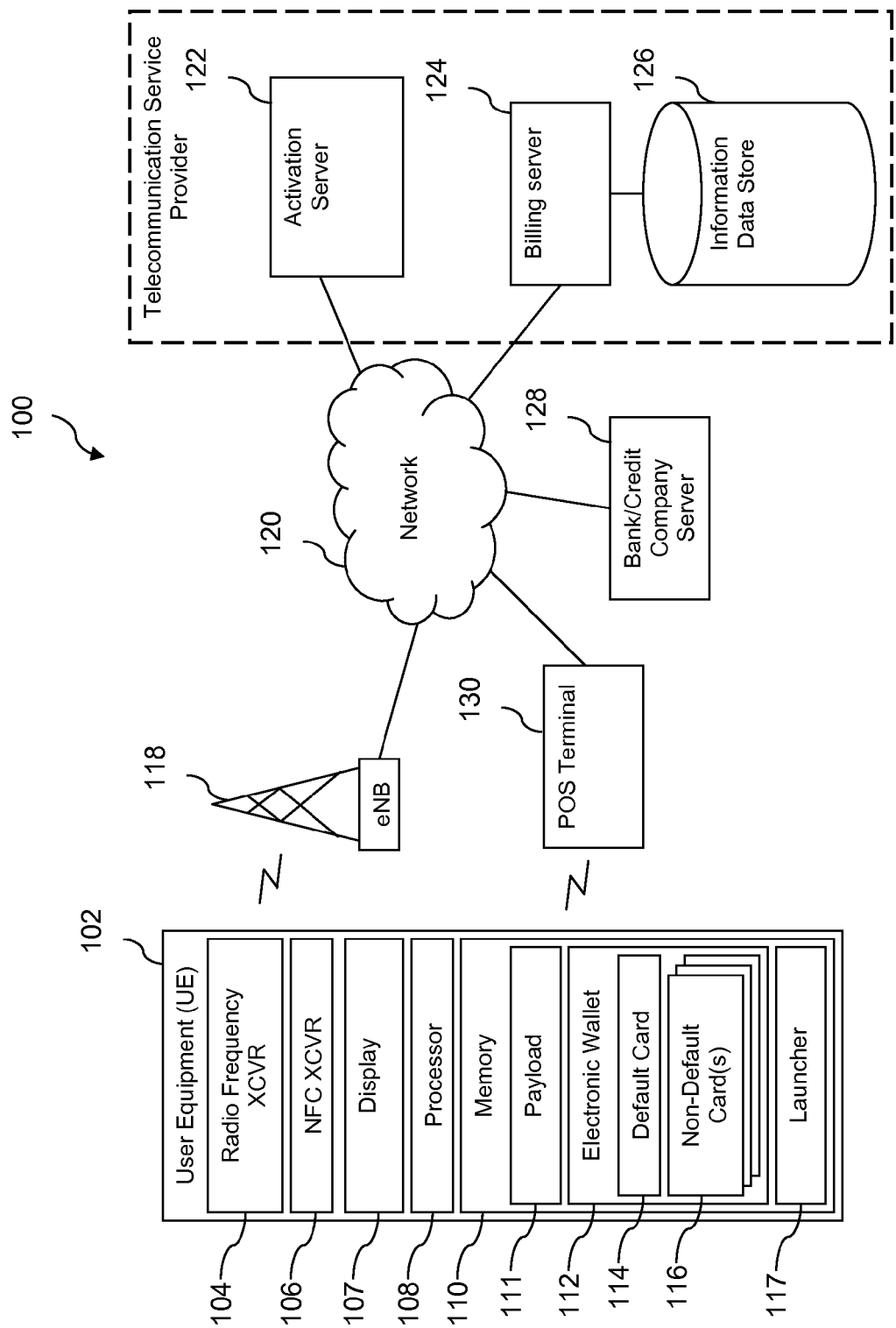
FIG. 1a is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a system for enforcing user equipment (UE) usage policy using an on-board application is disclosed. In the past, various usage policies were at least partially enforced through actions taken in a wireless communication service network, for example in a core network or in a radio access network (RAN). Such network based enforcement may not be effective in some circumstances and additionally may present some inconvenience and/or delays in resuming normal services when user compliance with a usage policy is restored. In the present disclosure, enforcement of usage policy is effected by an enforcement application coupled into the operating system (OS) of the UE, for example a launcher application. When a UE and/or a user behavior is not in compliance with a usage policy, the launcher application may supplant the customary home screen that provides access to all the functions and applications supported by the UE with a restricted screen. The restricted screen does not provide input controls to access the functions and applications and instead only provides a minimal set of input controls. For example, the restricted screen may provide controls to originate a call to emergency services e911 and controls to take some action that returns the UE and/or usage of the UE to compliance with the usage policy.

It is contemplated that a variety of usage policies may be applied to the UE and enforced by the policy enforcement application. In an embodiment, only a single usage policy is applied to the UE at one time. In another embodiment, a plurality of usage policies may be applied to the UE at the same time. In an embodiment, at a first time a first usage policy may be applied to the UE and at a second time a second usage policy, different from the first usage policy, may be applied to the UE. For example, in an embodiment, a first and a second usage policy may alternately be enforced on the UE diurnally, for example a first usage policy enforced during daytime hours and a second usage policy enforced during nighttime hours. In any combination of these scenarios, when any usage policy is determined to be violated by the UE and/or the user of the UE, the enforcement application may present the restricted screen, thereby preventing further violation of the subject usage policy and encouraging the user to take suitable action to resume compliance with the usage policy.

A usage policy may stipulate that one or more mandated third party applications be loaded into the UE and corresponding application selection input controls (i.e., application icons) presented on a touchscreen of the UE. For example, the wireless service provider may have an agreement with a third party application provider that provides a concession to the third party application provider. For example, the wireless service provider may have a corporate initiative to support green behavior that includes mandatory installation of a green living tips application on the UE that provides periodic notifications to the user of actions that can reduce his or her environmental impacts. If a user deleted one of the mandated third party applications from a user partition of memory, the enforcement application may detect this and present the restricted screen. The restricted screen in this circumstance may provide input controls to originate an e911 call and to contact an interactive voice recognition (IVR) system to obtain instructions on how to resume compliance with the subject usage policy. The IVR may provide the user information about why the subject third party application is mandatory, how to reinstall the third party application, and how to resume normal service of the UE.

A different usage policy may stipulate that one or more forbidden third party applications may NOT be loaded into the UE and associated forbidden selection input controls may NOT be presented on the touchscreen of the UE. For example, the usage policy may forbid installation of applications from a competing wireless communication service provider on the UE. For example, the usage policy may forbid installation of an application that is associated with the commission of cybercrimes. For example the usage policy may forbid installation of an application known to provide support for terrorist activities. If a user loaded one of the forbidden third party applications, the enforcement application may detect this and present the restricted screen. The restricted screen in this circumstance may provide input controls to originate an e911 call and to contact the IVR of the wireless service provider to obtain instructions on how to resume compliance with the subject usage policy. The IVR may provide the user information about why the third party application is forbidden, how to delete the third party application from the UE, and how to resume normal service on the UE.

A different usage policy may be that a default credit card be installed in an electronic wallet application of the UE and remain installed, whereby to provide a preferred placement in the electronic wallet for the credit card issuer. If a user replaced the default credit card with a different credit card, the enforcement application may detect this and present the restricted screen. The restricted screen in this circumstance may provide input controls to originate an e911 call and to contact the IVR of the wireless service provider to obtain instructions about how to resume compliance with the subject usage policy. The IVR may provide information to the user about why the credit card must remain the default credit card defined for the electronic wallet, for example because the cost of the UE was subsidized for the user by the issuer of the credit card as part of the UE purchase agreement the user approved. The IVR instructions may further provide information on how to restore the appropriate credit card to the default credit card in the electronic wallet and how to resume normal service on the UE.

A different usage policy may be that a user of the UE maintain the terms of a leasing agreement, for example making lease payments on time and returning the UE at the end of the lease period. Part of the terms of the UE leasing agreement may be that the UE establish communications connectivity to the RAN periodically. If the UE contacts the RAN, and the RAN sends a message to the enforcement application that the UE is out of compliance with the terms of the leasing agreement, the enforcement application may present the restricted screen. If the UE does not establish communications connectivity with the RAN at the prescribed periodic intervals (for example to avoid the RAN notifying the enforcement application that the UE is out of compliance with the leasing agreement), the enforcement application may present the restricted screen. The RAN may provide a code to the UE when it connects to the RAN, and the UE may store this code. The code may be stored in a protected area of memory, for example in a system partition or a carrier partition of memory, that is inaccessible to user access permissions. The enforcement application may check the stored code for comparison with a timing regime specified in the usage policy.

The restricted screen in this circumstance may provide input controls to originate an e911 call and to contact the IVR of the wireless service provider to obtain instructions about how to resume compliance with the subject usage policy. The IVR may provide information to the user about how the user violated the terms of the leasing agreement and may further provide information on how to achieve compliance, for example by completing a lease payment or stopping use volumes forbidden under the leasing terms.

In an embodiment, the enforcement application may be provided as a function of a launcher application of the UE. A launcher application generally is understood to receive touch inputs to a touchscreen of a UE, to determine what soft input control (e.g., what application icon is displayed at the location where the touch occurs) is selected and to activate or launch the associated application or function. A launcher application may be provided as part of an operating system of the UE. The launcher application is engaged in providing navigation through different input screens of the UE. For example, the launcher application may determine that a user has slid his finger across a first screen and respond by presenting a different screen that is logically deemed to be off to the left or right of the original screen. Notwithstanding, in another embodiment, in another embodiment, the enforcement application may be separate from the launcher application and may collaborate with the launcher application to present the restricted screen. Alternatively, in yet another embodiment, the enforcement application does not collaborate with the launcher application but is able to itself present the restricted screen without the launcher application's support, and possibly suspending the launcher application so it does not respond to user control inputs.

Usage policies may be downloaded and installed into the UE via the RAN and the core network of the service provider. This may be accomplished in concert with UE activation processes. Further, some usage policies may be downloaded and installed into the UE at any time during the service life of the UE (i.e., at a time after activation completes). The enforcement application may be configured to read from an area of memory where usage policies are installed, for example in a system partition of memory or in a carrier partition of memory, and to act to enforce the policies. In some cases, the usage policies downloaded may comprise both definition of usage policies and logic that the enforcement application may execute to determine compliance or non-compliance with the usage policies and to present the appropriate restriction screen. In some cases, the service provider may push usage policies and/or usage policy updates to the UE and to the enforcement application. In other cases, the enforcement application may periodically pull usage policies and/or usage policy updates to the UE. Depending on the subject usage policy, the enforcement application may evaluate compliance with the usage policy in response to a user control input or in response to a scheduled event, for example expiration of a timer related to how recently the UE last connected to the RAN.

In an embodiment, the enforcement application may enforce an electronic wallet default credit card usage policy. This may entail activating and maintaining/enforcing use of a credit card and or/other payment card on a user equipment (UE). UEs such as smartphones may be sold by original equipment manufacturers (OEMs) for a lump sum of approximately 600 dollars or another sum of money. In the United States, telecommunication service providers may provide account holders the opportunity to subsidize a new smartphone. The telecommunications service provider buys a smartphone from the OEM and allows an account subscriber to pay a portion of what the telecommunications service provider paid for the smartphone. In exchange, the account holder may agree to a two year contract to stay with the telecommunications service provider and pay off part of or all of the smartphone over that time period via monthly payments. It is a teaching of the present disclosure that a bank/credit card company may pay the telecommunication service provider for the opportunity to subsidize a new smartphone. As a tradeoff for subsidizing a new smartphone for a telecommunications service provider subscriber, a default credit card may be formatted and stored to an electronic wallet application that executes on the smartphone.

The electronic wallet may be an application on the new smartphone. Electronic wallets may function as an abstraction of a physical wallet that is used to hold credit cards, but instead of the cards being physical cards they are digital representations of the cards, e.g., confidential card information comprising one or more of a sixteen digit card number, a card holder name that is associated with the card, an expiration date of the card, and/or an authorization code of the card, and other information is stored to the electronic wallet to represent the card. The electronic wallet provides functions to use the financial services of the electronic wallet such as making a payment transaction, checking an account balance that the card is associated with, transferring money between accounts, checking a maximum card spending limit, and performing other financial services. The electronic wallet may provide a graphical user interface (GUI) with controls where the subscriber may enter information about a credit card, such as the type of credit card, the sixteen digit number that identifies the credit card, the expiration date that is associated with the credit card, and the three digit security code that goes along with the credit card. The subscriber may automatically access this information after the information has been inputted into the electronic wallet. The information of the card is stored and displayed, securely. This allows the subscriber to use their digital credit card both simply and securely. In an embodiment, the card may be a credit card or a debit card.

The card that is stored to the electronic wallet from the bank or credit card company may be a card assigned to fulfill a "default" card role in that it is the first payment option that is presented when a user or subscriber that is associated with the smartphone accesses their electronic wallet application to make a payment authorization. The default card may be automatically selected when the electronic wallet is accessed by the smartphone for making a payment authorization on a purchase. To facilitate payment using the default card via the electronic wallet, there may be an electronic reader or scanner that is able to determine the information of the credit card at a point-of-sale (POS) terminal at a store or other places where the default credit card may be used. The POS may utilize near field communication (NFC) protocol or another wireless communication protocol such as Bluetooth® to gather the information of the default card for payment.

In an embodiment, information of other credit cards may be stored to the electronic wallet. In order to utilize the information of the other credit cards that are not the default credit card, users may go through an extra step or two, such as opening the electronic wallet application on their smartphone and selecting a different card besides the default credit card. In this embodiment, using other credit cards aside from the default card may not be as convenient, but the process for doing so is straightforward and allows the user to quickly access information of other credit cards besides the default credit card. This benefits both the bank/credit card company and the customer as it allows the bank/credit card to have the default card remain the default credit card stored to the electronic wallet and still provides access by the user of the smartphone to other credit cards aside from the default card.

In another embodiment, information of other credit cards besides the default card may not be stored to the electronic wallet. If a user wants to use other credit cards aside from the default card that is stored to the electronic wallet, the user may enter in the information of another credit card for use during one transaction and the information of the other credit card may be deleted on completion of the transaction. While it is not as convenient for the user to only have simple use of the default credit card, the user did have the bank/credit card company make the initial payment for the new smartphone that they received. This might be a tradeoff for the bank/credit card company for paying the initial cost of the smartphone.

In an embodiment, enforcing use of the card assigned to the default card role of the electronic wallet is performed. An application that collaborates with a launcher application of the UE and that is encapsulated by an operating system (OS) on the smartphone may keep track of this. Alternatively, the functions of the application may be encapsulated in the launcher application. The application may periodically perform a check to see if the card that was assigned to the default card role is still the same card in case a user has tried to change it. In an embodiment, the application may receive messages from the telecommunication service provider that detail whether or not the user of the smartphone has paid the bill of the telecommunication service provider. In the event that the user has tried to change the default card, or has not paid their bill on time, the launcher may initiate a restriction sequence that is performed on the smartphone. In this event, a restricted screen may be presented when the user of the smartphone powers up or turns on the smartphone. The screen may provide the user with some options that comprise an option to call emergency services (911) or options to pay their bill, and call their telecommunications service provider that the account was set-up with. The user may not perform any other function until he/she has completed the steps for returning the phone back to the default state because the smartphone, while operating in this restricted mode, does not provide any user interface controls to access any other functions of the smartphone. The restriction sequence and restricted screen provides indemnity for the bank/credit card company in the event that a user that has signed up for a new smartphone has nefarious or malicious intentions that take advantage of the bank's role in subsidizing the smartphone.

By selecting the option to have a bank/credit card company to subsidize a smartphone on a telecommunication service provider plan, consumers are given another option for selecting a new telecommunications service provider and bank. In exchange for allowing the bank/credit card company to subsidize the new smartphone, a subscriber may receive a default credit card that is stored to an electronic wallet application on the smartphone. By doing this, it is possible that money spent by the user of the smartphone will flow or go through the bank/credit card company and allow the bank/credit card company to charge interest on purchases. This allows the telecommunication service provider to alleviate some stress of its role in the purchase and activation and purchase of new smartphones, by giving customers the option to subsidize a new smartphone using a bank or credit card company instead of the telecommunications service provider, itself. By subsidizing through a bank/credit card company, automatic payment for services rendered by the telecommunications service provider may be established on the default card, whereby the telecommunications service provider may reliably receive payment for services rendered by them.

Turning now to FIG. 1, a communication system 100 is described. The system 100 comprises a user equipment (UE) 102. The UE 102 comprises a radio frequency transceiver (RF XCVR) 104, a near field communication transceiver 106, a display 107, a processor 108, and a memory 110. The memory 110 comprises a payload 111 and an electronic wallet application 112. The electronic wallet application 112 comprises a default credit card 114, a plurality of non-default credit cards 116, and a launcher application 117. The system 100 further comprises an enhanced node B (eNB) 118, a network 120, an activation server 122, a billing server 124, an information data store 126, a bank/credit card company server 128, and a point-of-sale terminal 130. In an embodiment, the eNB 118, the activation server 122, the billing server 124, the information data store 126, the bank/credit card company server 128, and the POS terminal 130 may be communicatively coupled to the network 120. The network 120 may be a private communication network, a public communication network, or a combination thereof. The activation server 122, the billing server 124, and the information data store 126 may be associated with a telecommunications service provider. A usage policy (not shown) may be stored in the memory 110. The usage policy may be downloaded to the memory 110 during an activation process of the UE or at a later time.

The UE 102 may be a smartphone, a tablet computer, a wearable computer, or another communication enabled portable electronic device. In an embodiment, the UE 102 may be implemented as a handset. Details of handsets are discussed in more detail hereinafter. The radio frequency transceiver 104 may be used to communicatively couple the UE 102 with the eNB 118. The eNB 118 may communicatively couple the UE 102 to the network 120. In an embodiment, the eNB 118 may provide a communication link to the UE 102 according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another well-known wireless communication protocol. The NFC transceiver 106 may be used to communicatively couple the UE 102 with the POS terminal 130. The NFC transceiver 106 may provide a communication link to the POS terminal 130 according to one of a near field communication (NFC) wireless protocol, a Bluetooth wireless protocol, or another well-known wireless communication protocol.

The display 107 may be used to display or present content that has been accessed by a user of the UE 102. The display 107 also presents user interface controls that may be used to perform commands on the UE 102. The processor 108 may be used to execute the electronic wallet application 112. The electronic wallet application 112 may be a digital implementation of an abstraction of a wallet that stores information of various credit cards such as the default card 114 and/or the plurality of non-default cards 116. The electronic wallet application 112 may be generated via the arrival of the payload 111 from the activation server 122. The electronic wallet application 112 may already be installed on the UE 102 by a user of the UE 102. The default card 114 is formatted to the electronic wallet application 112 via the payload 111 from the activation server 122. Activation of the default card 114 is discussed further hereinafter in FIG. 1c.

When desiring to make a purchase using the default card 114, the electronic wallet application 112 may be launched by the launcher application 117 and executed by the processor 108. For example, a user may touch an electronic wallet icon on a touch screen of the UE 102; in response, the launcher application 117 may launch the electronic wallet application 112; and the processor 108 may then execute the electronic wallet application 112. The electronic wallet application 112 may present some graphical user interface controls that provide a user of the UE 102 an option to use the default card 114 and other options. To make a payment authorization, the default card 114 performs a transaction via an electronic reader, scanner, or other device at the POS 130 where it may be read or scanned from the UE 102. The electronic wallet application 112 may provide functions associated with financial services such as make a payment authorization/transaction, check an account balance of the default card 114 or other non-default cards 116, transfer money between accounts, check a remaining a maximum spending limit of a card, and other financial services.

The electronic wallet application 112 when launched may present a user interface on the display 107 that gives several options. The user interface may first comprise an option to use the default card 114. The user interface may further comprise an option to not use the default card 114. In response to selecting the option to not use the default card 114, a list of previously stored non-default cards 116 may be presented on the display 107. If there are no previously stored non-default cards 116, the user interface may present a template for entering information of a non-default card 116.

In an embodiment, information of non-default cards 116 may be stored to the electronic wallet application 112. In order to utilize the information of the non-default cards 116, users may go through an extra step or two as compared to using the default card 114, such as opening the electronic wallet application 112 on the UE 102 and selecting a non-default card 116 via graphical user interface controls that are displayed on the display 107. In another embodiment, information of non-default cards 116 may not be stored to the electronic wallet application 112. If a user wants to use a non-default card 116, the user may enter in the information of a non-default card 116 for use during one transaction and the information of the non-default card 116 may not be saved to the electronic wallet application 112.

The default card 114 may be a card assigned to fulfill a default card 114 role. Information associated with a card assigned to the default card 114 role may be formatted to the memory 110 of the UE 102 via the payload 111 that arrives when the new UE 102 is first activated. The payload 111 is transmitted by the activation server 122 upon activation of the UE 102. The information associated with the card assigned to fulfill the default card 114 role may comprise one or more of a sixteen digit card number of the default card 114, an expiration date of the default card 114, a name of an account holder associated with the default card 114, and a three digit security code that is associated with the default card 114. The identity of the card may comprise any of the aforementioned information of the card, and may comprise other information. The account holder may choose a telecommunications service provider plan that subsidizes the UE 102 via a bank/credit card company. For having the bank/credit card company subsidize the UE 102, the UE 102 and the electronic wallet application 112 may be formatted with the default card 114. The default card 114 may receive bias or preference for use of payment when the electronic wallet application 112 is accessed to make a payment authorization. The default card 114 may be the first payment option presented to a user of the UE 102 whenever the user accesses the electronic wallet 112. The default card 114 may be the only payment option presented when the electronic wallet application 112 is accessed.

The plurality of non-default cards 116 may be information associated with other credit cards inputted by the user of the UE 102 into the electronic wallet application 112. The information of the non-default cards 116 may comprise the sixteen digit card number associated with a card, the expiration date associated with the card, the name associated with the card, and the three digit security code that is associated with the card. In an embodiment, the user may store a pre-defined number of non-default cards 116 to the electronic wallet application 112. The pre-defined number of non-default cards 116 may comprise one card, two cards, three cards, five cards, ten cards, or another pre-defined number of cards. In an embodiment, accessing the control functions provided by the electronic wallet 112 to select the non-default cards 116 may entail the user following a moderately inconvenient and/or time consuming navigation path, thereby leading the user to the desired behavior of instead using the default card 114.

In an embodiment, the user of the UE 102 may not store information of any of the non-default cards 116 to the electronic wallet application 112. The user of the UE 102 may enter the information of a non-default card 116 at the time of completing a payment transaction so that they may pay for a single purchase, but the information of the non-default card 116 may not be stored to the electronic wallet application 112 after the transaction has been completed. This may make the use of a non-default card 116 moderately inconvenient, thereby leading the user to the desired behavior of instead using the default card 114.

The launcher application 117 may be used to enforce assignment of the default card 114. In some contexts the launcher application 117 may be referred to as an enforcement application. In an embodiment, the enforcement application may be separate from the launcher application but may collaborate with the launcher application 117 to present the restriction screen. For example, the launcher application 117 may read the usage policy, evaluate compliance of the UE with the usage policy (or policies), and when the UE is non-compliant with the usage policy, the launcher application 117 presents a restricted screen. The UE may be found to be non-compliant because a configuration of the UE does not comply with the usage policy or because a usage of the UE does not comply with the usage policy.

Said in other words, the launcher application 117 may prevent user reassignment of the identity of the default card 114 from a first credit card identity to a second credit card identity. In addition, the launcher application 117 launches other applications that execute on the UE 102. The launcher application 117 may be provided by an operating system (OS) of the UE 102. The launcher application 117 may check the memory 110 to determine if the card that was assigned to fulfill the default card 114 role has not been changed. For example, an authoritative identity of the credit card assigned to enjoy the role of the default card 114 may be stored in a system partition of memory 110 which would be inaccessible to a user. The launcher application 117 may then check to see if the credit card identity assigned to the default card 114 role in the electronic wallet application 112 corresponds to the default credit card identity stored in the system partition of memory 110.

The launcher application 117 may also check to see if a bill associated with the default card 114 has been paid. The bill may be associated with the bill for services rendered by the telecommunication service provider that is associated with the UE 102. Said in other words, in an embodiment, the default card 114 may be configured in a communication service provider's billing system as the source of automatic payment for a subscriber's service account. If one of these checks fails, the launcher application 117 may launch or present a restricted screen on the display 107 of the UE 102. The restricted screen that is launched by the launcher application 117 may be presented on either a lock-screen of the UE 102, or may be presented on a home screen that is presented on the display 107 or the UE 102. The home screen may be accessed by unlocking the lock screen via entering a personal identification number (PIN), completing a swipe pattern, performing a finger print scan, and other methods that allow the UE 102 to bypass the lock screen. Presentation of the restricted screen is discussed further hereinafter in FIG. 1b.

The activation server 122, the billing server 124, and the information data store 126 may be associated with a telecommunications service provider. The activation server 122 may communicate with the bank/credit card company server 128 when a new account for the UE 102 is being set-up. The activation server 122 may also communicate with the POS terminal 130 when activation of a new UE 102 is set-up. The activation server 122 may also communicate with the billing server 124 when activation of a new UE such as the UE 102 is set-up. The billing server 124 may receive notification from the activation server 122 of the bank/credit card company has been selected to subsidize the UE 102. The information data store 124 may store information of billing and accounts and may receive this information from the billing server 124. In the case of a bank/credit card company subsidizing the UE 102, the account number that is stored to the information data store 126 may be the sixteen digit card number that is associated with the default card 114.

The bank/credit card company server 128 may be associated with a bank or credit card company that subsidizes the UE 102. The POS terminal 130 may be located at a telecommunications service provider store, or another location that sells UEs such as the UE 102. The POS terminal 130 may utilize NFC communication protocol to communicatively couple with the UE 102. The POS terminal may also connect to the UE 102 to deliver the payload 111 via the activation server 122. While one UE 102, eNB 118, one POS terminal 130, one bank/credit card company server, one activation server 122, one billing server 124, and one information data store are illustrated in FIG. 1a, it is understood that the system 100 may comprise any number of UEs 102, eNBs 118, POS Terminals 130, bank/credit card company servers 128, activation servers 122, billing servers 124, and information data stores 126. While three non-default cards 116 are illustrated in FIG. 1a, it is understood that there may be any number of non-default cards 116.

In an embodiment, the electronic wallet application 112 is executed by the processor 108. The electronic wallet 112 transmits a payment authorization to the POS terminal 130 for a credit card assigned to fulfill the default card 114 role whose identity is stored in the electronic wallet application 112. The default card 114 is automatically selected for use when the electronic wallet application 112 is accessed by the UE 102 for making a payment authorization. The launcher application 117 that functions on the OS is executed by the processor 108. The launcher application 117 checks a status of the default card 114. In an embodiment, the launcher application 117 may check to see if a bill associated with the default card 114 has been paid. The launcher application 117 may check the status of a default credit card account when the UE 102 is turned on. The launcher application 117 also checks to see if the default card 114 that was assigned to fulfill the role of the default card 114 by the activation server 122 via the bank/credit card company server 128 is the same card. Information of the default card 114 that was formatted into the electronic wallet application 112 via the payload 111 may be stored to a system memory partition in the memory 110 where the information may be inaccessible to a user or other user applications. Some memory 110 may be allocated to the launcher 117 so that the launcher application 117 may check to see if the card assigned to the default card 114 role is still the same card. The launcher application 117 may determine this by reading information associated with the payload 111 that initiated the formatting of the card associated with the information of the default card 114 into the default card 114 role. The payload 111 may be stored to a system memory partition of the memory 110 of the UE 102, whereby the information may not be tampered with. This is done so that a malicious user of the UE 102 may be prevented from changing the default card 114.

In response to one of the checks failing, the launcher application 117 presents or launches a restricted lock/home screen on the display 107 of the UE 102. The restricted screen only allows the UE 102 to contact emergency services (e911), to restore the identity of the default credit card 114 to the authorized credit card identity, and/or to pay a bill associated with the default card 114 of the UE 102. The restricted screen may be said to block access to user interface controls to two or more of initiating a non-emergency phone call, accessing email, sending short message service (SMS) messages, accessing a contact list, using a web browser, using user installed applications, and using a global positioning system (GPS) application. In an embodiment, access to user controls may not be hidden, but instead are inaccessible to the user of the UE 102 when the restricted screen is presented, simply because the restricted screen provides no input controls for selecting other screens, only input controls for (a) making an e911 call, (b) restoring the identity of the default credit card to the authorized credit card identity (e.g., the identity of the default credit card of record stored in the system partition of memory 110), and (c) paying a bill associated with the default credit card 114. In an embodiment, the restricted screen presents notification of a number of emails received by the UE 102, SMS messages received by the UE 102, and social media messages from social media application received by the UE 102 since or before the restricted screen was initiated. The notification of the various messages received may be presented on a pre-selected portion of the display 107, e.g., the upper-left hand portion of the display 107. Access to the content of these notifications is not available until the user has taken the steps to return the UE 102 to a default-state via the user interface controls that are displayed on the restricted screen.

Figure 1B:
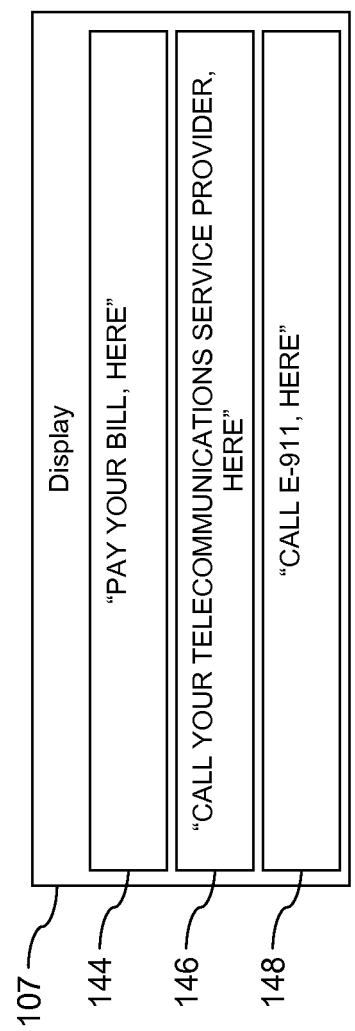
FIG. 1b is an illustration according to an embodiment of the disclosure.

In FIG. 1b, an illustration of the restricted screen presented on the display 107 is disclosed. The illustration comprises the display 107. The display 107 further comprises launcher rendered content that is presented on the display 107. The launcher rendered content provides a user of the UE several options when the restricted screen is presented. There may be an option for a user to pay a bill associated with the default card denoted by the "Pay your bill, here" option 144. There may be an option to call the telecommunication service provider denoted by the "Call your telecommunications service provide, here" option 146. In an embodiment, the "call your telecommunications service provider, here" control may connect the UE 102 to an interactive voice recognition (IVR) system that walks the subscriber through the process of restoring the default credit card 114 to the identity of the default credit card of record stored in the system memory partition of the UE 102. The IVR system may further explain to the user the reason why the launcher application 117 is driving him or her to restore the default credit card 114, for example reminding the user of a purchase agreement according to which the user agreed to make the subject credit card the default credit card 114 in exchange for a full or partial subsidy of the purchase price of the UE 102. There may be an option to call local emergency services denoted by the "Call e-911, here" option 148. There may be other options that are presented on the restricted screen. In an embodiment, the colors presented on the screen may be presented in the normal colors that the UE utilizes. The colors may be converted to grayscale. The user of the UE may only select these options when the restricted screen has been presented on the display 107. The restricted screen may remain until the user of the UE 102 has performed the task they are supposed to perform in order to re-access full functionality of the UE 102. Until the user has performed the task to re-access full functionality of the UE 102, other controls or possible navigation pathways may not be available to be accessed by the UE 102.

Figure 1C:
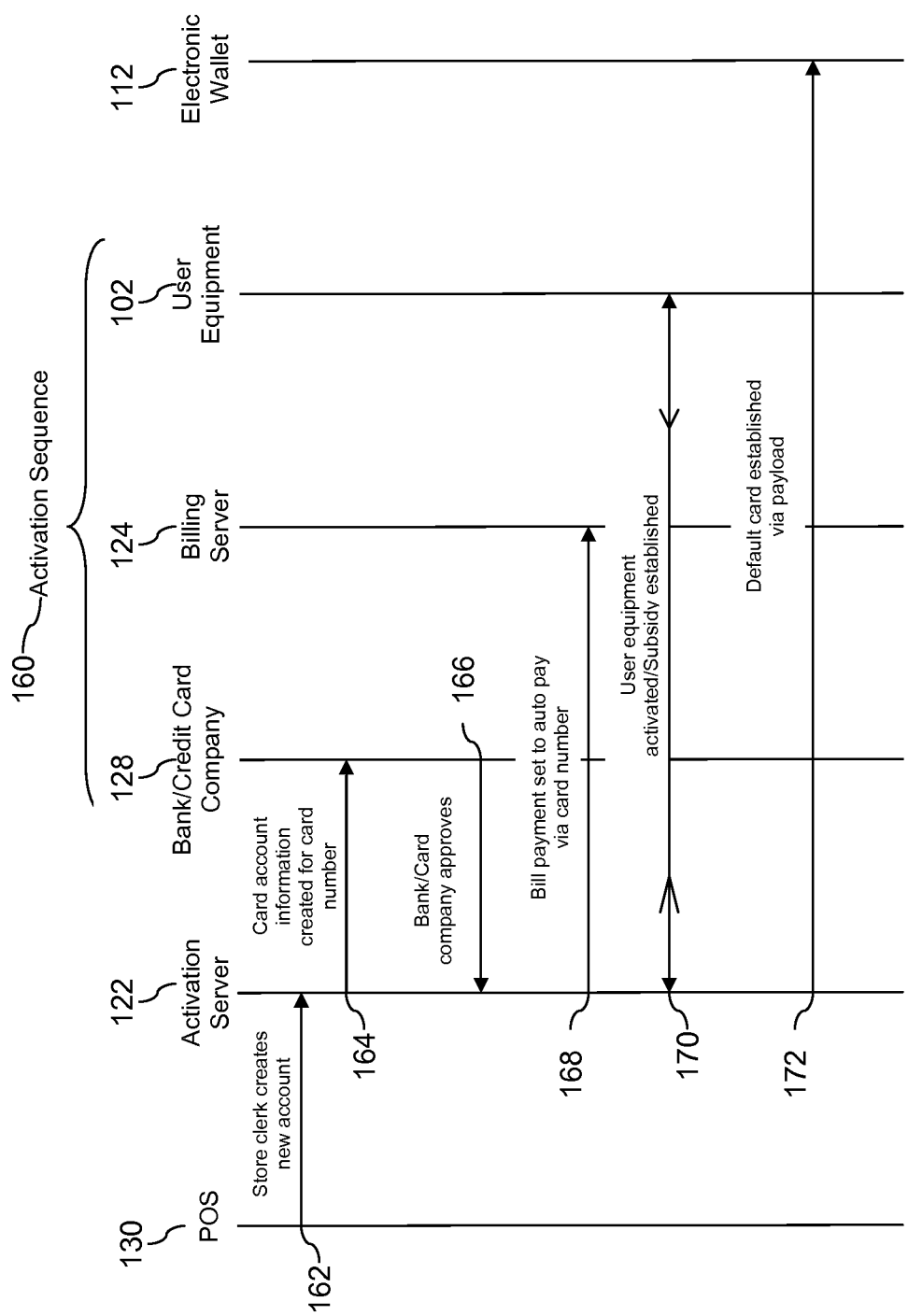
FIG. 1c is a chart of an activation sequence according to an embodiment of the disclosure.

In FIG. 1c, a diagram of an activation sequence 160 for the default card 114 issued with the UE 102 is disclosed. The activation sequence 160 may comprise the POS 130, the activation server 122, the bank/credit card company server 128, the billing server 124, the UE 102, and the electronic wallet application 112. At step 162, a telecommunications service provider store clerk may activate a new UE 102, sending the account holder's information to the activation server 122 via the POS 130. In an embodiment, the account holder has chosen to subsidize the UE 102 via a bank/credit card company. At step 164, the activation server 122 sends a message with the information of the account holder to the bank/credit card company server 128 to generate information for a new card that will be designated as the default card for the electronic wallet application 112 on the UE 102. At step 166, the bank/credit card company server 128 sends a message that comprises the new default card information to the activation server 122. The message details that the activation of the UE 102 that is subsidized by the bank/credit card company and the creation of a default card has been approved and completed. At step 168, the activation server 122 sends a message to the billing server 124 to set-up automatic payment for the account holder which will charge the payments for services rendered by the telecommunication service provider to the default card. At step 170, the billing server 128 messages the activation server 122 informing the activation server 122 that automatic payment has been set-up; the activation server 122 activates the UE 102 and establishes the subsidy on the UE 102 by messaging the bank/credit card company server 128, wherein the message details that UE 102 has been activated. At step 172, the activation server 122 transmits a payload to the UE 102 that formats the electronic wallet application 112 executing on the UE 102. The payload formats the electronic wallet application 112 to establish the information of the card created for the account holder to fulfill a role as the default card for the electronic wallet application 112.

In an embodiment, an account holder may choose to establish a pre-existing card that they own as a default card and subsidize a new UE 102 via the bank/credit card company that is associated with the pre-existing card. To establish subsidization using a bank/credit card company that is associated with a pre-existing card, the store clerk at the POS terminal 130 may swipe the card using a card reader and send the information to the bank/credit card company server 128. The bank/credit card company server 128 may approve the subsidization of a new UE 102 by establishing the pre-existing card as the default card in the electronic wallet application 112. Once the card has been approved to be the default card by the bank/credit card company server 128, the activation sequence may be completed according to the activation sequence 160.

Figure 2:
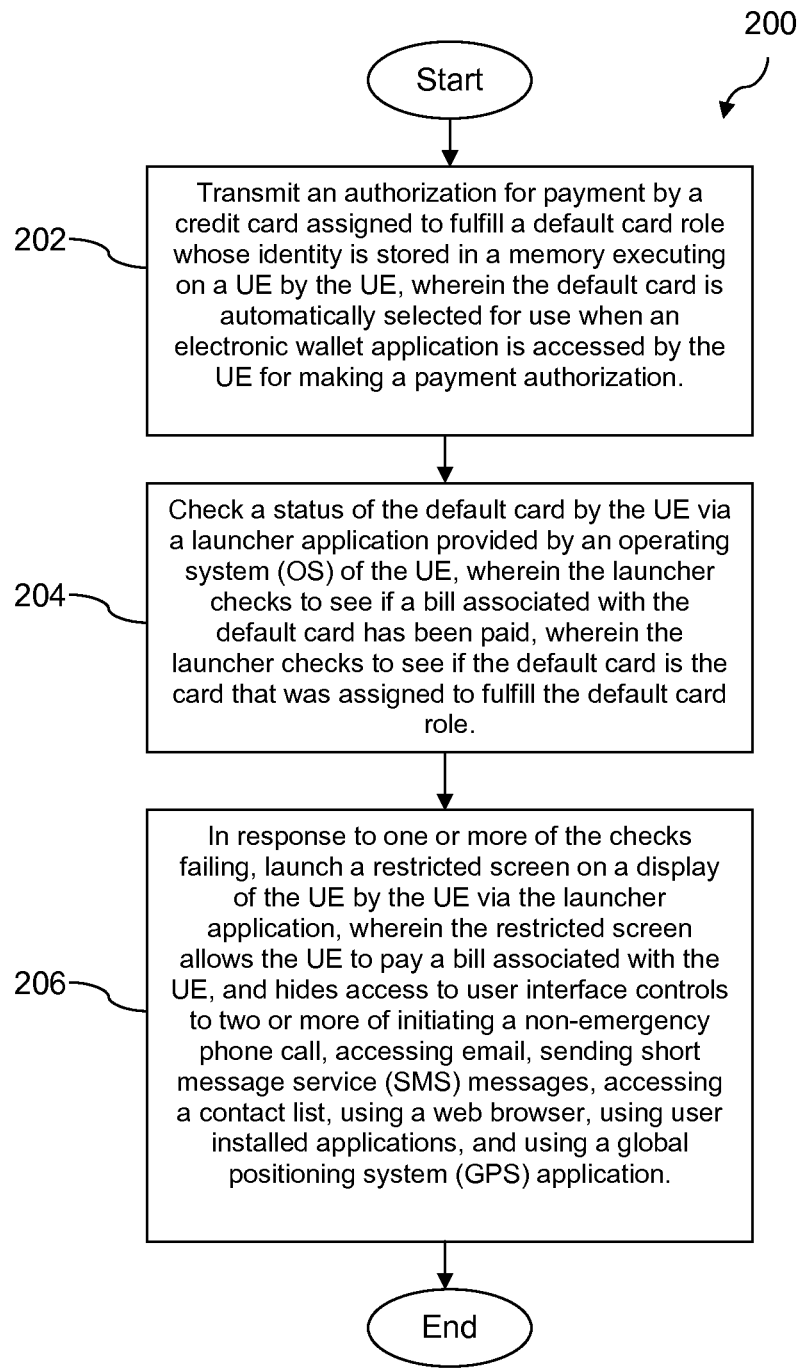
FIG. 2 is a flow chart of a method according to an embodiment of the disclosure.

In FIG. 2, a method 200 is described. At block 202, a user equipment (UE) via an electronic wallet application transmits a payment authorization for a credit card assigned to fulfill a default card role whose identity is stored in an electronic wallet application executing on the UE, wherein the default card is automatically selected for use when the electronic wallet application is accessed by the UE for making a payment authorization. At block 204, a launcher application provided by an operating system (OS) of the UE checks a status of the default card by the UE, wherein the launcher checks to see if a bill associated with the default card has been paid, wherein the launcher checks to see if the default card is the card that was assigned to fulfill the default card role. The launcher application is provided by the OS of the UE. The launcher application may be embedded in the OS. Alternatively, the launcher application may be stored in a system memory partition of the memory where it is inaccessible to users and/or user applications. The launcher application may write to and read from the system memory partition, wherein the system memory partition serves to protect the identity of the card that fulfills the default card role. At block 206, the launcher, in response to one or more of the checks failing, launches a restricted screen on a display of the UE, wherein the restricted screen allows the user of the UE to pay a bill associated with the UE, and hides access to user interface controls to two or more of initiating a non-emergency phone call, accessing email, sending short message service (SMS) messages, accessing a contact list, using a web browser, using user installed applications, and using a global positioning service (GPS) application. In an embodiment, access to user interface controls aside from the restricted screen controls is not hidden, but inaccessible to the UE until the user of the UE has performed the task that will return the UE back to full functionality.

Figure 3:
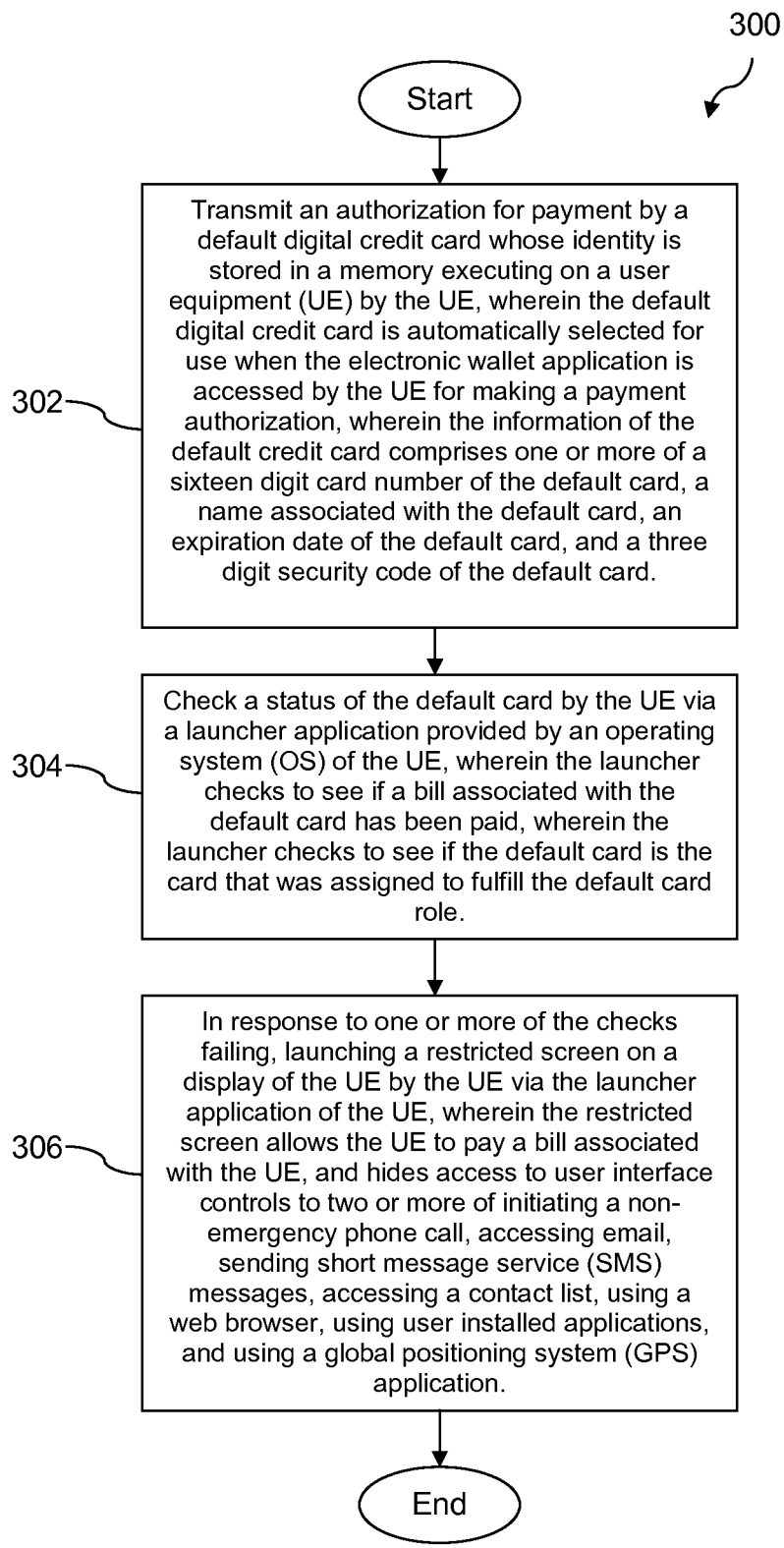
FIG. 3 is a flow chart of another method according to an embodiment of the disclosure.

In FIG. 3, a method 300 is described. The method may be seen to be a method of using and enforcing a usage policy on a user equipment. Initially, a usage policy may be installed on the UE, for example during an activation process of the UE or after completion of activation of the UE, for example months after completion of activation. The usage policy may be stored in a memory of the UE. The method comprises installing a usage policy on the UE, wherein the usage policy mandates the maintenance of a specific credit card in the role of a default credit card by an electronic wallet application of the UE. The method further comprises storing an identity of the specific credit card in one of a system partition or a carrier partition of memory of the UE. The method transmits an authorization for payment by a credit card assigned to fulfill the default card role in the electronic wallet application of the UE whose identity is stored in memory allocated for use by the electronic wallet, wherein the default card is automatically selected for use when the electronic wallet application is accessed by the UE for making a payment authorization. A launcher application checks compliance of the UE with the usage policy by comparing the identity of the specific credit card stored in the system partition or the carrier partition to the identity of the credit card associated with the default credit card role stored in the memory allocated for use by the electronic wallet application, wherein the launcher application is provided by an operating system of the UE. In response to the checks failing to confirm a match of credit card identities, launching a restricted screen on a display of the UE via the launcher application, wherein the restricted screen allows the UE to pay a bill associated with the UE, and hides access to user interface controls to two or more of initiating a non-emergency phone call, accessing email, sending short message service (SMS) messages, accessing a contact list, using a web browser, using user installed applications, and using a global positioning system application.

At block 302, transmit a payment authorization for the default digital credit card whose identity is stored in an electronic wallet application executing on a user equipment (UE) by the UE, wherein the default digital credit card is automatically selected for use when the electronic wallet application is accessed by the UE for making a payment authorization, wherein the identity of the default credit card comprises one or more of a sixteen digit card number of the default card, a name associated with the default card, an expiration date of the default card, and a three digit security code of the default card. The identity of the card may comprise any of the aforementioned information of the card, and may comprise other information. In an embodiment, the UE may receive a payload from an activation server, wherein the payload comprises information associated the card assigned to fulfill the default card role. The payload updates the electronic wallet application and establishes the card assigned to fulfill the default card role as the default card in the electronic wallet application. At block 304, check a status of the default card by the UE via a launcher application functioning on an operating system (OS) of the UE, wherein the launcher checks to see if a bill associated with the default card has been paid, wherein the launcher checks to see if the default card is still the default card. In an embodiment, the UE receives billing from a billing server that is associated with the default card. The billing may be of purchases made using the default card and/or billing associated with services rendered by a telecommunications service provider. The UE may receive a payment status notification from the billing server. The UE may store the payment status notification to the electronic wallet application. At block 306, in response to one or more of the checks failing, launch a restricted screen on a display of the UE by the UE via a launcher application that functions on an operating system (OS) of the UE, wherein the restricted screen allows the UE to pay a bill associated with the UE, and hides access to user interface controls to two or more of initiating a non-emergency phone call, accessing email, sending short message service (SMS) messages, accessing a contact list, using a web browser, using user installed applications, and using a global positioning system (GPS) application.

Figure 4:
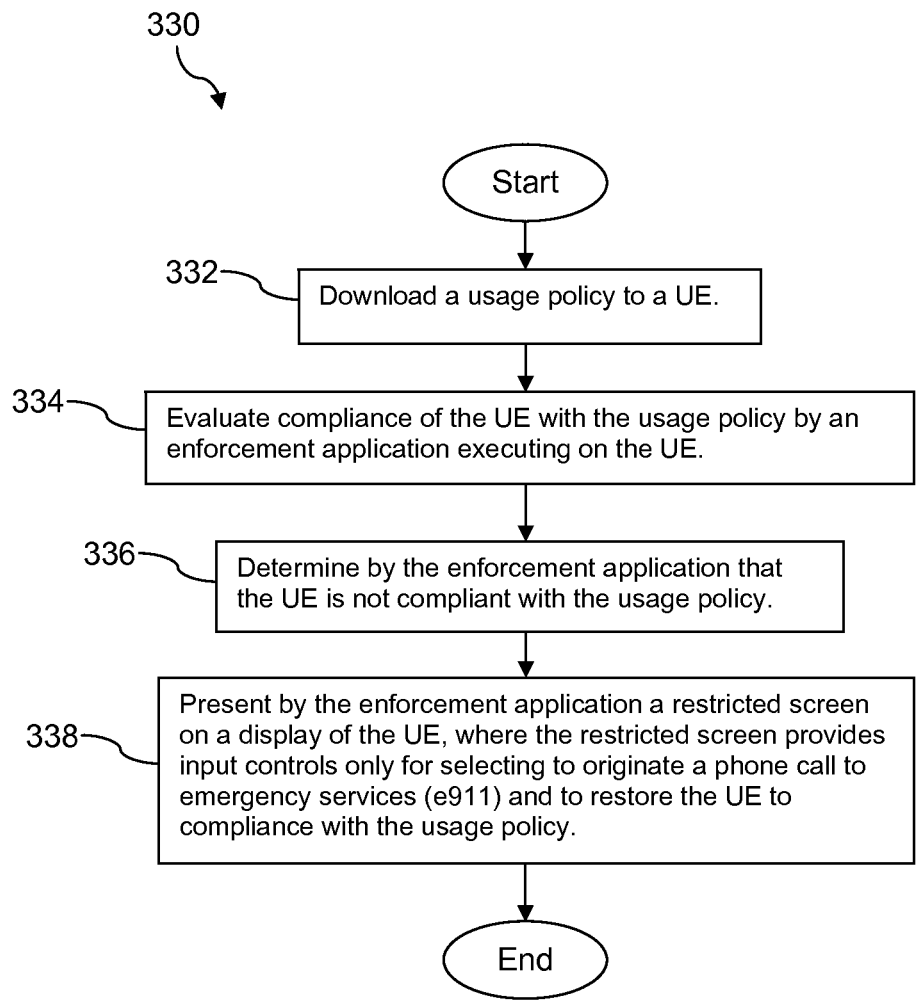
FIG. 4 is a flow chart of yet another method according to an embodiment of the disclosure.

Turning now to FIG. 4, a method 330 is described. At block 332, a usage policy is downloaded to the UE. The usage policy may be downloaded to the UE during an activation process of the UE or after completion of the activation process of the UE. For example, the usage policy may be downloaded months after the UE has been activated. In an embodiment, the usage policy may be stored in an area of memory inaccessible with normal user permissions. For example, the usage policy may be stored in a system partition or a carrier partition of memory. An operating system of the UE may enforce restricted access to a system partition of memory and to a carrier partition of memory. For example, the operating system may require inputting system level security credentials to access the system partition. System level security credentials may only be known to an original equipment manufacturer of the UE. The operating system may require inputting carrier level security credentials to access the carrier partition. Carrier level security credentials may only be known to a wireless service provider carrier. As described above, the usage policy can related to a variety of UE configuration matters or UE usage matters.

At block 334, compliance of the UE with the usage policy is evaluated by an enforcement application executing on the UE. The evaluation may take place periodically, for example once per day. Alternatively, the evaluation may take place in response to an event on the UE or in a radio access network (RAN) to which the UE is connected. In an embodiment, the enforcement application is a launcher application. At block 336, the enforcement application determines that the UE is not in compliance with the usage policy.

At block 338 the enforcement application presents a restricted screen on a display of the UE, where the restricted screen provides input controls only for selecting to originate a phone call to emergency services (e911) and to restore the UE to compliance with the usage policy. In an embodiment, other applications remain in service on the UE, to the extent that they may respond to calls from the operating system, for example as triggered by electronic inputs such as incoming phone calls, incoming text messages, preset alarms sounding, etc., but no user selectable input controls for commanding these applications and/or functions of the phone are provided by the restricted screen, and hence these applications are substantially unusable. For example, an incoming phone call may ring a ringer of the UE, but the restricted screen provides the user no input control to select going off-hook or to connect to the call. An aural alert may indicate that a text message has been received by a text messaging application of the UE, but restricted screen provides the user no input control for displaying the new text message. In an embodiment, while the restricted screen is presented on the display of the UE, a phone dialer application, an email application, a messaging application, and a camera application installed on the UE remain in service on the UE but no control inputs are provided in the display to promote activation of the phone dialer application, the email application, the messaging application, or the camera application.

Figure 5:
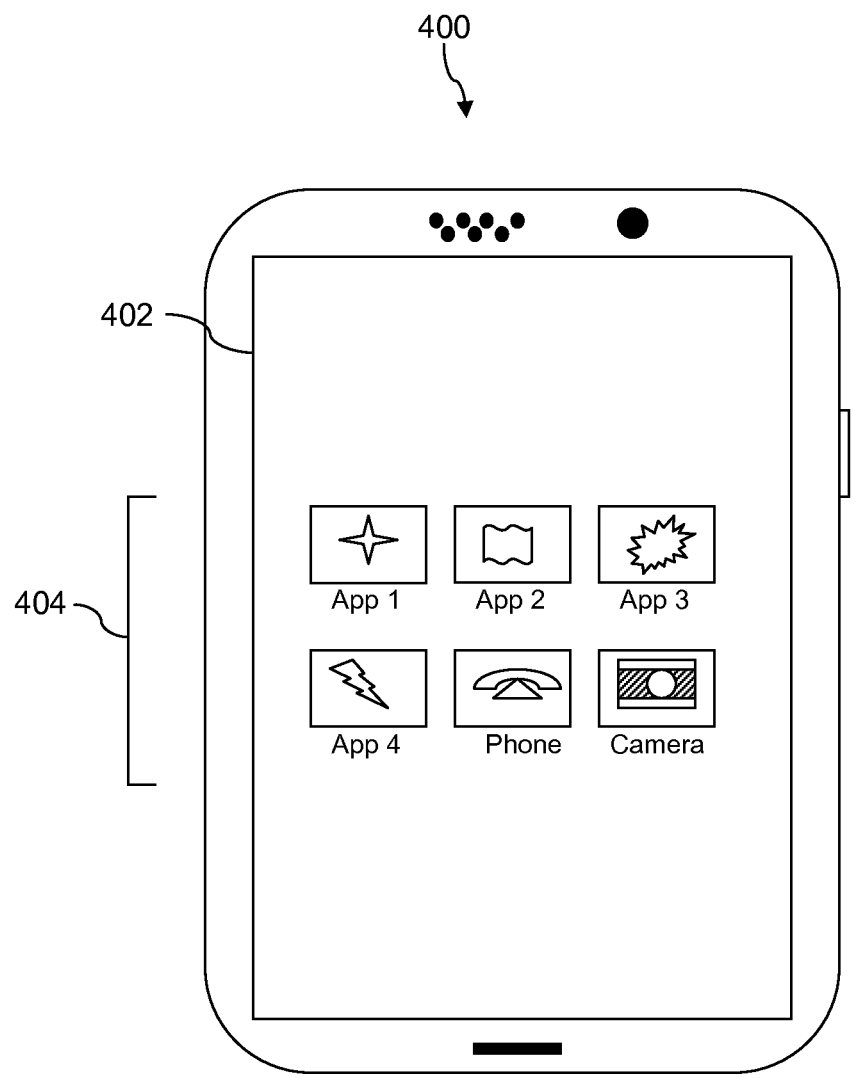
FIG. 5 is a block diagram of a user equipment (UE) according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
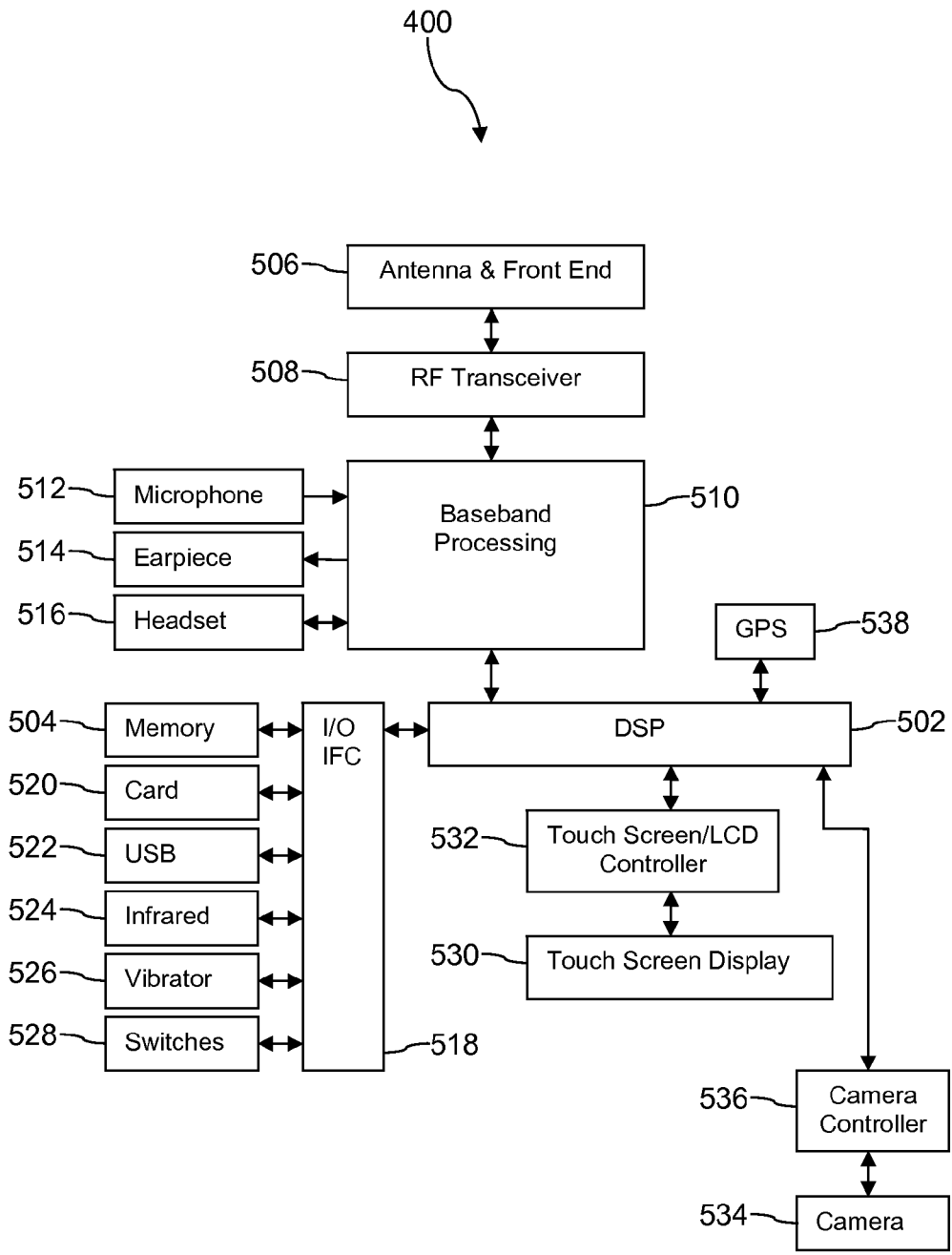
FIG. 6 is a block diagram of hardware architecture of user equipment according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
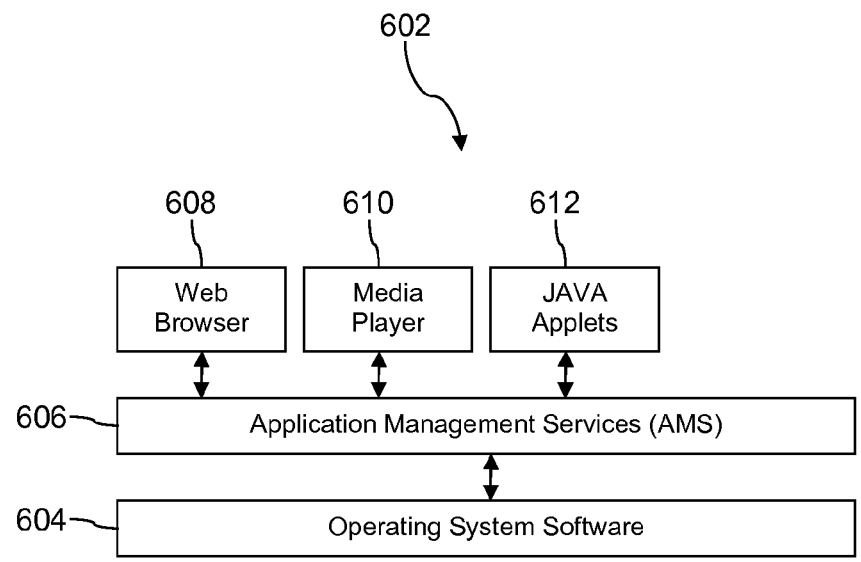
FIG. 7A is a block diagram of a software architecture of a user equipment according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
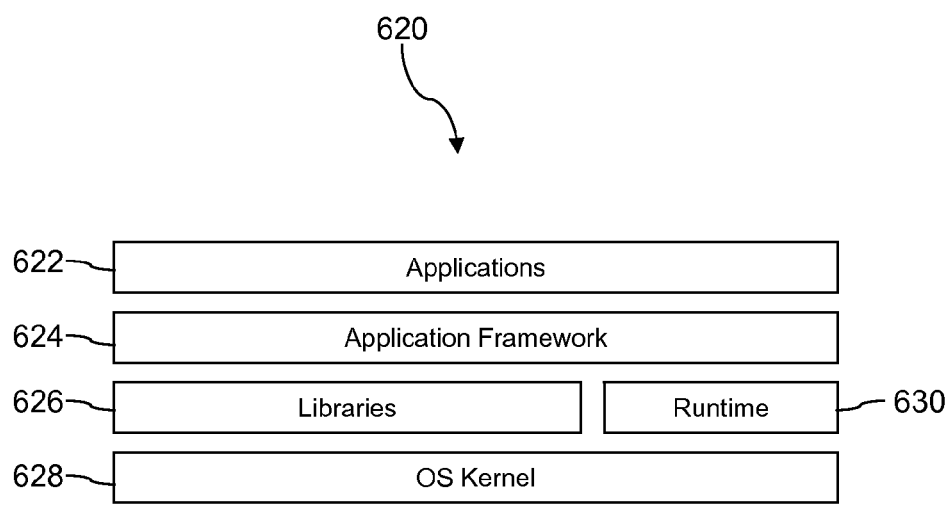
FIG. 7B is a block diagram of another software architecture of a user equipment according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
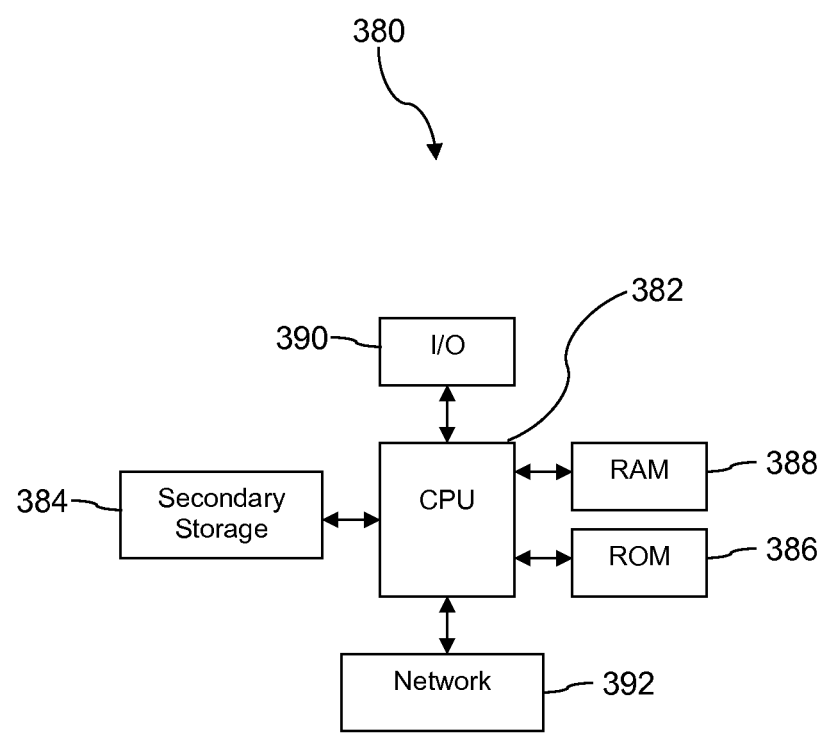
FIG. 8 illustrates an exemplary computer system suitable for implementing the several embodiments of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
a processor;
a touchscreen display;
a memory storing a usage policy;
an enforcement application stored in the memory that, when executed by the processor,
reads the usage policy,
evaluates compliance of one of a UE configuration and a UE usage with the usage policy,
determines that the UE configuration or UE usage are non-compliant with the usage policy; and
presents a restricted screen on the touchscreen display, wherein the restricted screen provides touch input controls only for selecting to originate a phone call to emergency services (e911 call) and to at least one of restore the UE configuration to comply with the usage policy or adapt UE usage to comply with the usage policy.

2. The UE of claim 1, wherein the enforcement application is a launcher application.

3. The UE of claim 1, wherein the usage policy mandates that the UE connect to a radio access network (RAN) at a pre-defined periodic rate and the restricted screen provides a touch input control for selecting to connect the UE to the RAN.

4. The UE of claim 1, further comprising an electronic wallet application stored in the memory that, when executed by the processor, provides a credit card payment functionality based on a default credit card identity stored in a portion of the memory allocated for use by the electronic wallet application, wherein the memory stores a credit card identity defined by the usage policy, the usage policy mandates maintaining the credit card identified in the usage policy as a default credit card in the electronic wallet application, and determining that the UE configuration is non-compliant with the usage policy comprises determining that the credit card identity defined by the usage policy does not match the default credit card identity stored in the portion of memory allocated for use by the electronic wallet application.

5. The UE of claim 4, wherein the restricted screen touch input control to restore the UE configuration to comply with the usage policy comprises an input control to restore the default credit card identity stored in the portion of the memory allocated for use by the electronic wallet application to the credit card identity defined by the usage policy.

6. The UE of claim 1, wherein the usage policy mandates the installation of a specified third party application in the memory and the restricted screen touch input control to restore the UE configuration to comply with the usage policy comprises an input control to download and install the specified third party application in the memory.

7. The UE of claim 1, wherein the usage policy is stored in a system partition or a carrier partition of the memory, wherein neither the system partition nor the carrier partition of the memory are accessible with user level permissions.

8. The UE of claim 1, wherein the restricted screen provides notification of a number of emails received, SMS messages received, and social media messages received.

9. A method of enforcing usage policy on a user equipment (UE), comprising:
downloading a usage policy to a UE;
evaluating compliance of the UE with the usage policy by an enforcement application executing on the UE;
determining by the enforcement application that the UE is not compliant with the usage policy; and
presenting by the enforcement application a restricted screen on a display of the UE, where the restricted screen provides input controls only for selecting to originate a phone call to emergency services (e911) and to restore the UE to compliance with the usage policy.

10. The method of claim 9, wherein the enforcement application is a launcher application.

11. The method of claim 9, wherein the usage policy is downloaded to the UE during an activation process of the UE.

12. The method of claim 9, wherein the usage policy is stored in one of a system partition or a carrier partition of memory of the UE.

13. The method of claim 9, wherein while the restricted screen is presented on the display of the UE, a phone dialer application, an email application, a messaging application, and a camera application installed on the UE remain in service on the UE but no control inputs are provided in the display to promote activation of the phone dialer application, the email application, the messaging application, or the camera application.

14. The method of claim 9, wherein the usage policy is downloaded to the UE after completion of an activation process of the UE.

15. The method of claim 9, wherein the usage policy mandates maintenance of a specific credit card in a role of a default credit card by an electronic wallet application of the UE.

16. The method of claim 15, further comprising:
storing an identity of the specific credit card in one of a system partition or a carrier partition of memory of the UE;
transmitting an authorization for payment by a credit card assigned to fulfill the default card role in the electronic wallet application of the UE whose identity is stored in memory allocated for use by the electronic wallet, wherein the default credit card is automatically selected for use when the electronic wallet application is accessed by the UE for making a payment authorization;
checking by the enforcement application compliance of the UE with the usage policy by comparing the identity of the specific credit card stored in the system partition or the carrier partition to the identity of the credit card associated with the default credit card role stored in the memory allocated for use by the electronic wallet application, wherein the enforcement application is a launcher application provided by an operating system of the UE, and wherein determining that the UE is non-compliant with the usage policy comprises determining that identity of the specific credit card stored in the system partition or the carrier partition does not match the identity of the credit card associated with the default credit card role stored in the memory allocated for use by the electronic wallet application.

17. The method of claim 16, wherein the input controls to restore the UE to compliance with the usage policy comprises an input control to restore the identity of the credit card associated with the default credit card role stored in the memory allocated for use by the electronic wallet application to the identity of the specific credit card stored in the system partition or the carrier partition.

18. The method of claim 16, wherein a user interface is presented on the display via the electronic wallet application when making a payment that comprises an option to use the default card and an option to not use the default card.

19. The method of claim 18, wherein in response to selecting the option to not use the default card, a list of previously stored non-default credit cards is presented on the display or a template for entering information of a non-default card is launched when there are no other non-default cards.

20. The method of claim 9, wherein the restricted screen provides notification of a number of emails received, SMS messages received, and social media messages received.

\* \* \* \* \*